United States Patent [19]

Takase et al.

[11] Patent Number: 5,703,869
[45] Date of Patent: Dec. 30, 1997

[54] METHOD AND APPARATUS OF MULTIPLEXING DIGITAL SIGNAL

[75] Inventors: Akihiko Takase, Tokyo; Shirou Tanabe, Hachioji, both of Japan

[73] Assignee: Hitachi Ltd., Tokyo, Japan

[21] Appl. No.: 504,782

[22] Filed: Jul. 19, 1995

Related U.S. Application Data

[63] Continuation of Ser. No. 82,015, Jun. 25, 1993, Pat. No. 5,461,626, which is a continuation of Ser. No. 497,626, Mar. 23, 1990, abandoned.

[30] Foreign Application Priority Data

Mar. 27, 1989 [JP] Japan .................................. 1-071714

[51] Int. Cl.[6] ......................................................... H04J 3/22
[52] U.S. Cl. .......................................... 370/229; 370/538
[58] Field of Search .................................. 370/94.1, 94.2, 370/60, 60.1, 61, 58.1, 85.6, 85.1, 112, 84, 229, 332, 333, 334, 335, 414, 416, 412, 391, 389, 458, 535, 536, 538, 541, 540, 542, 543, 544; 340/825.5, 825.51, 825.52

[56] References Cited

U.S. PATENT DOCUMENTS 4,955,017  9/1990  Eng et al. .................................. 370/60
5,020,052  5/1991  DePrycker et al. ...................... 370/60
5,461,626  10/1995  Takase et al. ......................... 370/94.1

Primary Examiner—Dang Ton
Attorney, Agent, or Firm—Antonelli, Terry, Stout, & Kraus, LLP

[57] ABSTRACT

A digital signal multiplexing method and apparatus include statistically multiplexing packet signals which are transferred through first transmission lines having a first speed to a second transmission line having a second speed, the second speed being higher than the first speed. The method includes the steps of dividing the signal transmitted to the second transmission line through a plurality of logical transmission paths, distributing the packet signals to the plurality of logical transmission paths and transmitting on a packet unit basis, distributing the multiplexed packet signals which are statistically multiplexed to the second transmission line through receiving logical transmission lines corresponding to the plurality of logical transmission lines, and generating the received packet signals from the receiving logical transmission lines; the received packet signals corresponds to the first transmission lines.

5 Claims, 11 Drawing Sheets

METHOD AND APPARATUS OF MULTIPLEXING DIGITAL SIGNAL

This is a continuation of application Ser. No. 08/082,015, filed Jun. 25, 1993 now U.S. Pat. No. 5,461,626; which is a continuation of application Ser. No. 07/497,626, filed Mar. 23, 1990 now abandoned.

BACKGROUND OF THE INVENTION

The present invention relates to a statistical multiplexing method and apparatus in a packet communication system and, more particularly, to a method and apparatus of efficiently multiplexing a high speed packet signal to a transmission line of a large capacity.

In the packet switching system, a packet multiplexer for statistically multiplexing signals from a plurality of terminals is used. The packet multiplexer is provided between the terminal equipment and the packet switching system and temporarily stores packet signals into a memory from a plurality of terminal equipment and sequentially transmits the packet signals to the switching system.

An example of such a statistical multiplexer has been disclosed in the literature by Marek R. Wernik, "Architecture and Technology Considerations for Multimedia Broadband Communications" Proceedings of Global Telecommunications Conference, November, 1988, pp. 663–667.

Two kinds of effects are obtained in the signal multiplex. The first effect is the improvement of the efficiency of the transmission line. The signals transmitted from the terminal equipment do not always exist at a time when there is no signal to be transmitted from the multiplexer. At such a time, the other terminal equipment may use the transmission line, so that the utilization of the multiplexing transmission line can be increased. Second, the transmission cost per terminal equipment can be reduced by sharing the transmission line with other terminal equipment. The line costs can be reduced by transmitting the signals from a plurality of terminal equipment in a lump rather than by directly transmitting the signals from terminal equipment to the switching system.

A packet multiplexer is used to obtain the first effect. A circuit multiplexer is used to obtain the second effect. The circuit multiplexer is different from the packet multiplexer, in that the timing positions in the secondary circuit (multiplexing circuit) of all of the primary circuits are deterministically assigned in the circuit multiplexer. Hitherto, the circuit multiplexer is generally used for multiplexing to the transmission line which has a large capacity. Such a method is based on a feature in which as the circuit multiplex executes the deterministic operation, the high speed operation can be performed as compared with the packet multiplex.

The statistical multiplexing is executed by multiplexing to the primary circuits. Such a multiplexing method is effective where the multiplexed circuit speed is sufficiently higher than the packet signal speed. The packet signals from the terminal equipment are statistically multiplexed to the primary circuits of the circuit multiplexer by the packet multiplexer. The circuit multiplexer deterministically multiplexes the primary circuits to the secondary circuit of a large capacity.

In a conventional packet multiplexer, it is presumed that the speed of the packet signals is sufficiently lower than the speed of the packet multiplexing signal. For instance, the packet signal speed could be set to 64 kb/sec while the packet multiplexing signal speed is set to 1.5 Mb/sec, and the ratio between those speeds is ten times or more.

It has been disclosed in the above-mentioned reference literature that even in the case where high speed signals such as video information or file information of a large capacity are assembled for packets and are multiplexed, in order to obtain the similar statistic effects, it is necessary that the multiplexing circuit speed is set to be higher than the high speed packet signal speed by ten times or more.

However, if the packet signal speed is set to be $1/10$ or more of the primary circuit speed, as mentioned above, no statistic effect is derived and such a case is equivalent to that the circuits of the speed similar to the packet signal speed are deterministically assigned. Further, if the packet signals of a speed which is set to be $1/2$ or more of the primary circuit speed are input from the terminal equipment which are packet multiplexed to the same primary circuit, the other packet signals cannot be transmitted in spite of the fact that almost of the secondary circuit is usable.

In the case where the packet signals of the speed similar to the primary circuit speed of such a circuit multiplexer are statistically multiplexed, the signal processes substantially similar to that in the secondary circuit of the circuit multiplexer are requested. To cope with such signals of a large capacity, the fairly higher signal processing speed than that in the conventional packet multiplexer is requested. Such a method of statistically multiplexing by the packet multiplexer is generally not practical from a view point of the multiplexing costs.

SUMMARY OF THE INVENTION

It is an object of the present invention to provide the statistical multiplexing to the circuits of a large capacity by the signal processing capability at a speed which is substantially equal to the packet signal speed.

To solve the above objects, according to the present invention, the packet signals from terminal equipment are distributed to a plurality of primary circuits and the primary circuits are multiplexed to secondary circuit and are transmitted. For demultiplexing, the packet signals which were distributed and transmitted to a plurality of primary circuits are concentrated in correspondence to a source and are transmitted to a switching system.

According to the above configuration, since the packet signals from the terminal equipment can exist at all of the timing positions in the secondary circuit without being limited into a single primary circuit, this results in that the packet signals were statistically effectively multiplexed into the secondary circuit. On the other hand, each of the means for distributing the packet signals into a plurality of primary circuits and the means for concentrating the packet signals from a plurality of primary circuits in correspondence to the source merely needs the same signal processing speed as the primary circuit speed. The signal processes of the speed similar to the speed of the secondary circuit of a large capacity are unnecessary. That is, the statistical multiplexing to the circuits of a large capacity can be realized by the signal processing capability of the speed similar to the packet signal speed.

DESCRIPTION OF THE PREFERRED EMBODIMENTS

Figure 1:
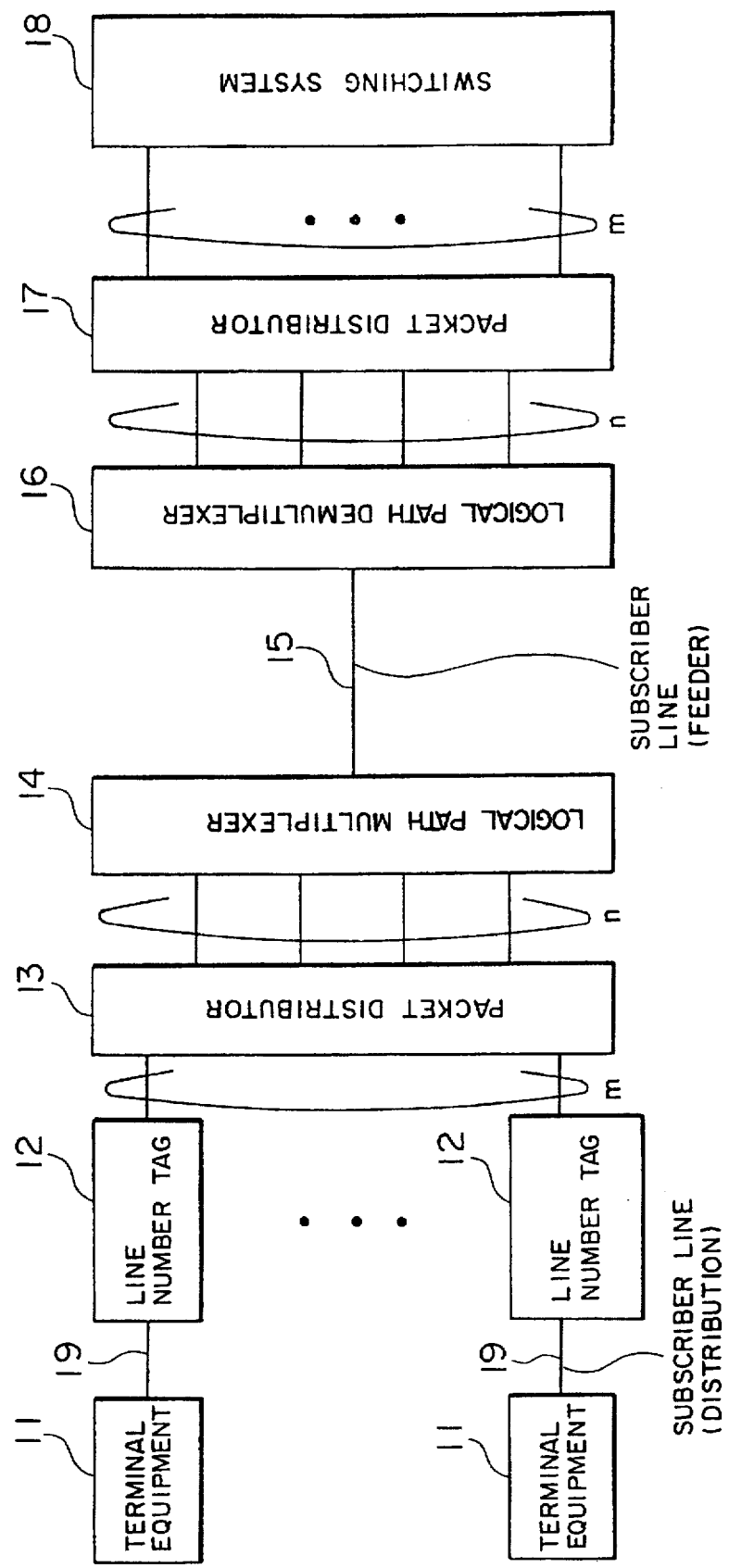
FIG. 1 is a diagram showing a fundamental construction of an embodiment of the present invention.

FIG. 1 shows an embodiment of the present invention. Subscriber line numbers which were fixedly assigned to subscriber distribution lines 19 corresponding to terminal equipment 11 are written to be incorporated into packet signals from the terminal equipment 11 by a subscriber line number tag section 12. The subscriber line numbers can be also assigned to special areas of packet headers or can be also realized as source addresses by decorating on the basis of a predetermined rule. A packet distributor 13 distributes the packet signals which were input from the m subscriber line number tag sections corresponding to the terminal equipment to n circuits forming logical transmission. A logical path multiplexer 14 multiplexes n primary circuits and sends the resulting signal to a physical transmission line 15.

A logical path demultiplexer 16 installed in an exchange demultiplexes the signals from the physical transmission to n primary circuits and to form m primary logical transmission paths. A packet distributor 17 concentrates the packet signals having the same subscriber line number in accordance with the subscriber line numbers from the n primary circuits or m primary logical transmission paths and sends it to m inputs of a switching system 18, respectively.

Figure 2:
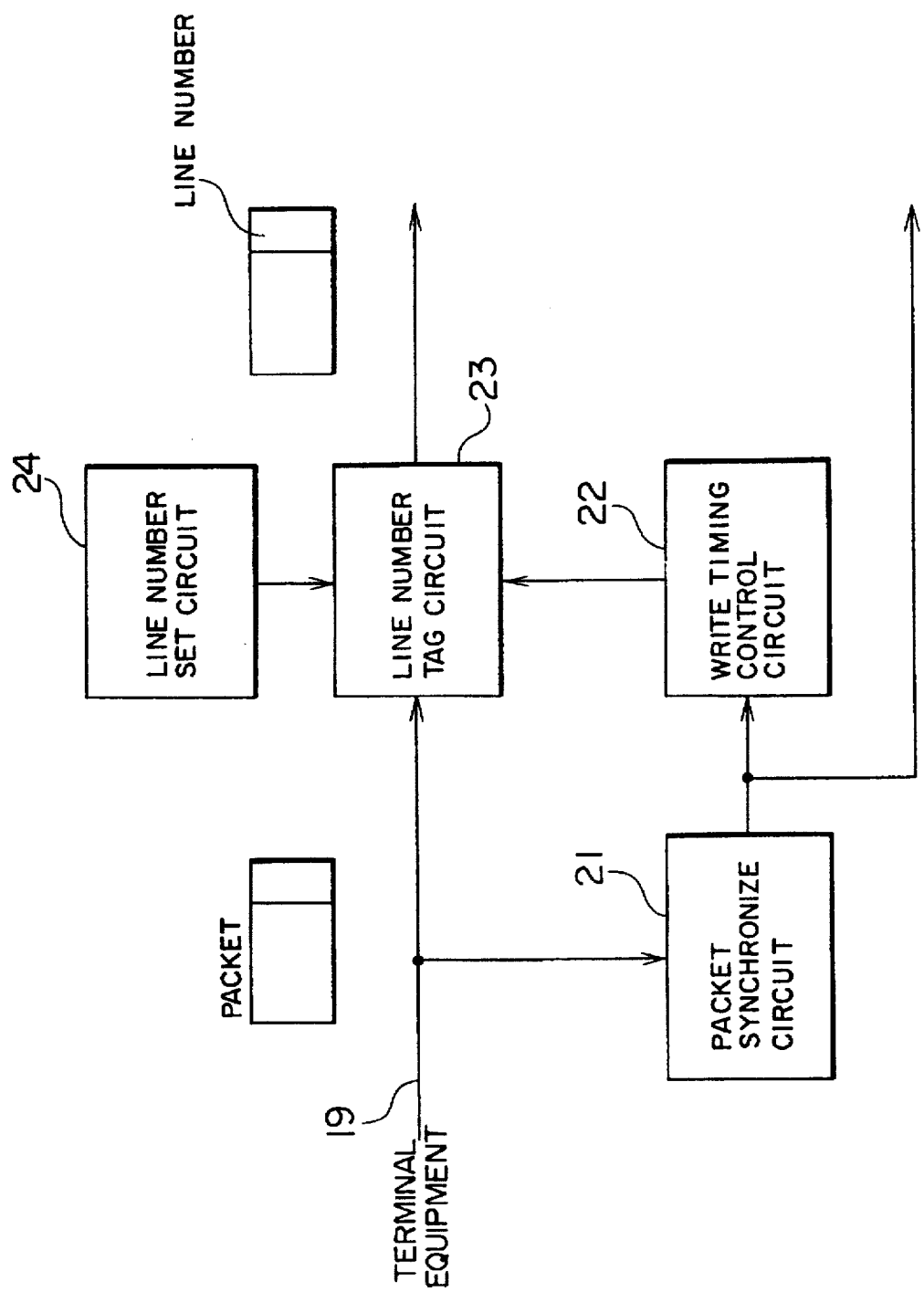
FIGS. 2 to 6, 10, and 11 are diagrams showing the details of each functional block in FIG. 1, respectively.

FIG. 2 shows the details of the subscriber line number tag section 12. The packet signals which were input from the terminal equipment 11 through the subscriber distribution lines 19 are supplied to a packet synchronize circuit 21, by which separating timings of packets are detected. In a write timing control circuit 22, the subscriber line number writing positions of packet header portions are indicated to a subscriber line number tag circuit 23 from the packet separating timings. At the designated timings, the subscriber line number tag circuit 23 writes the information which was set by a subscriber line number set circuit 24 into the header portions of the packet signals.

Figure 3:
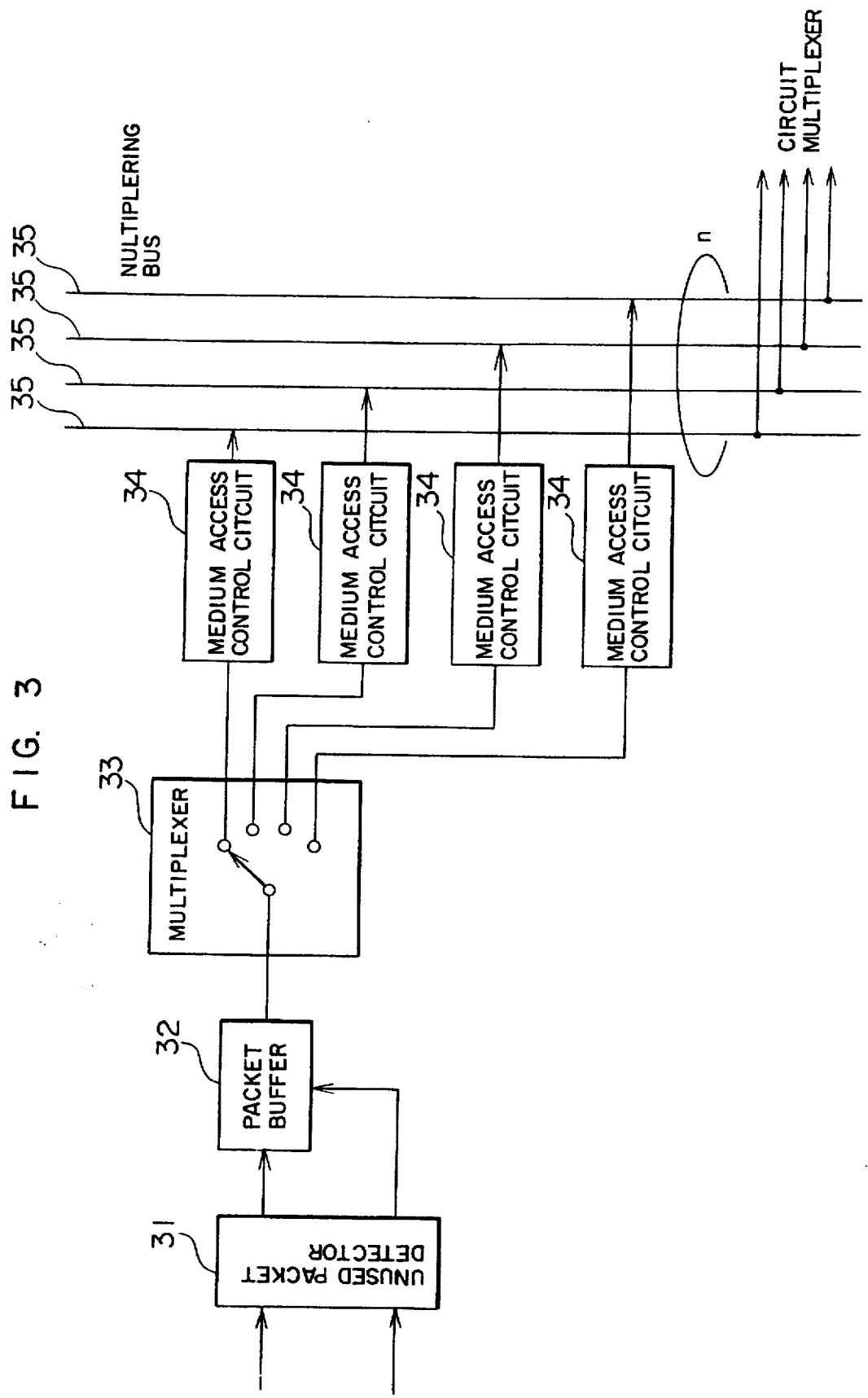

FIG. 3 is a diagram explaining the details of the packet distributor 13. In FIG. 3, as portions corresponding to reference numerals 31 to 34, m portions are necessarily in correspondence to the subscriber line number tag portions. However, all of the m portions are not shown but only one of them is shown. An unused packet detector 31 detects the packet signals which are not used among the packet signals from the subscriber line number tag portions 12 and controls buffer 32 so as not to write them into buffer 32. If predetermined packet signals were written into the buffer, a multiplexer 33 sequentially transmits the predetermined packet signals into a medium access control circuit 34. The multiplexer sequentially cyclically transmits the packet signals in accordance with the arrival order in correspondence to the n primary circuits to form m logical transmission paths. The medium access control circuit 34 is connected to a multiplexing buses 35 corresponding to the primary circuits. The medium access control circuits corresponding to all of the terminal equipment are connected to the multiplexing buses. The packet signals are transmitted while confirming that the other terminal equipment are not using any of the multiplexing buses. The multiplexing buses are connected as primary circuits to the circuit represents the logical transmission paths multiplexer 14, respectively.

Figure 4:
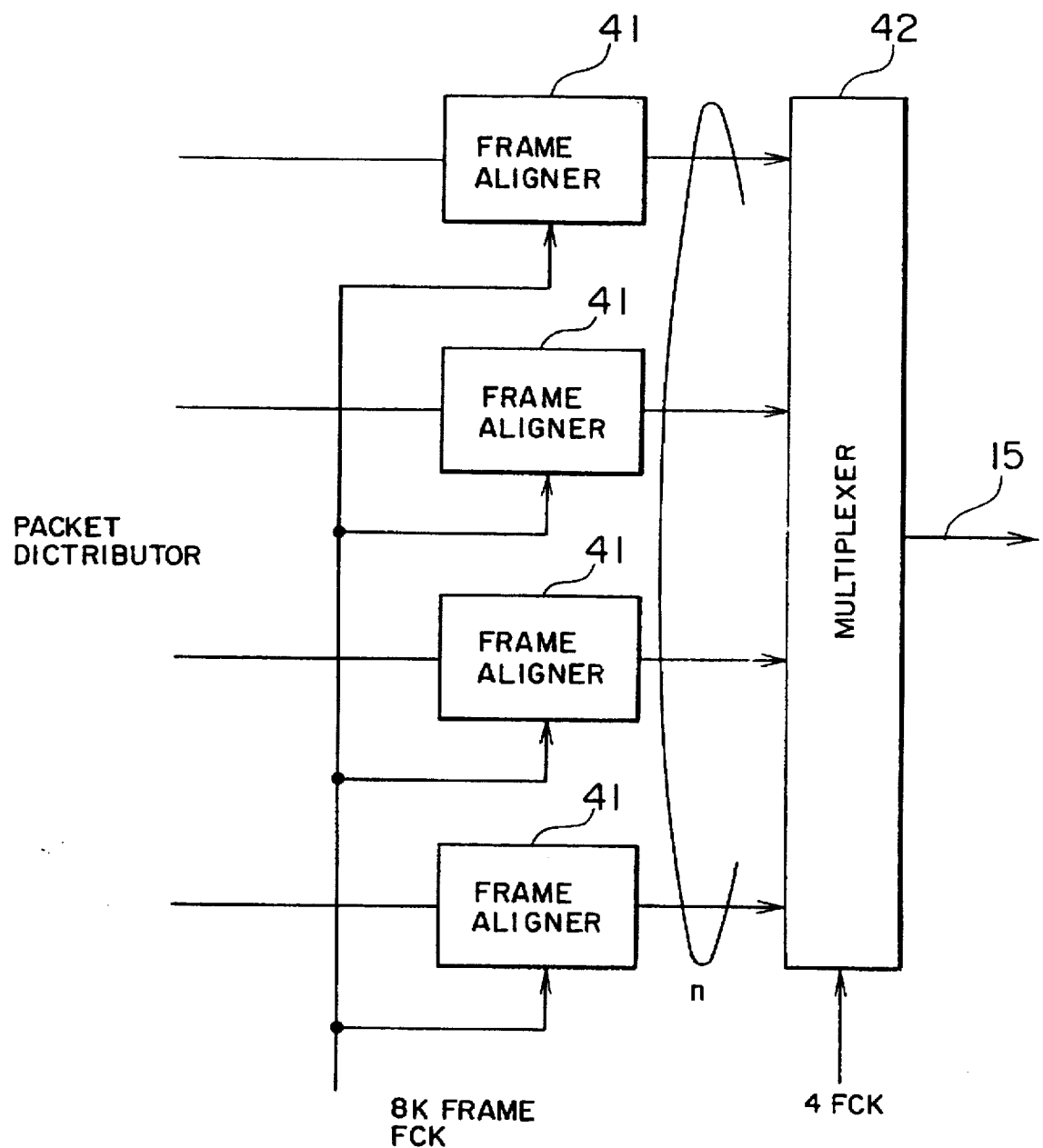

FIG. 4 is a diagram showing the circuit multiplexer. A frame aligner 41 constructs a transmission frame by clocks of 8 kHz which are supplied from the system and clocks corresponding to a circuit speed $F_{ck}$. A multiplexer 42 multiplexes n inputs at the speed which is n times as high as the circuit speed, thereby forming $n \times F_{ck}$ circuit multiplexing signals. Then, the multiplexer 42 sends the circuit multiplexing signals to the secondary circuit, that is, the subscriber line 15.

Figure 5:
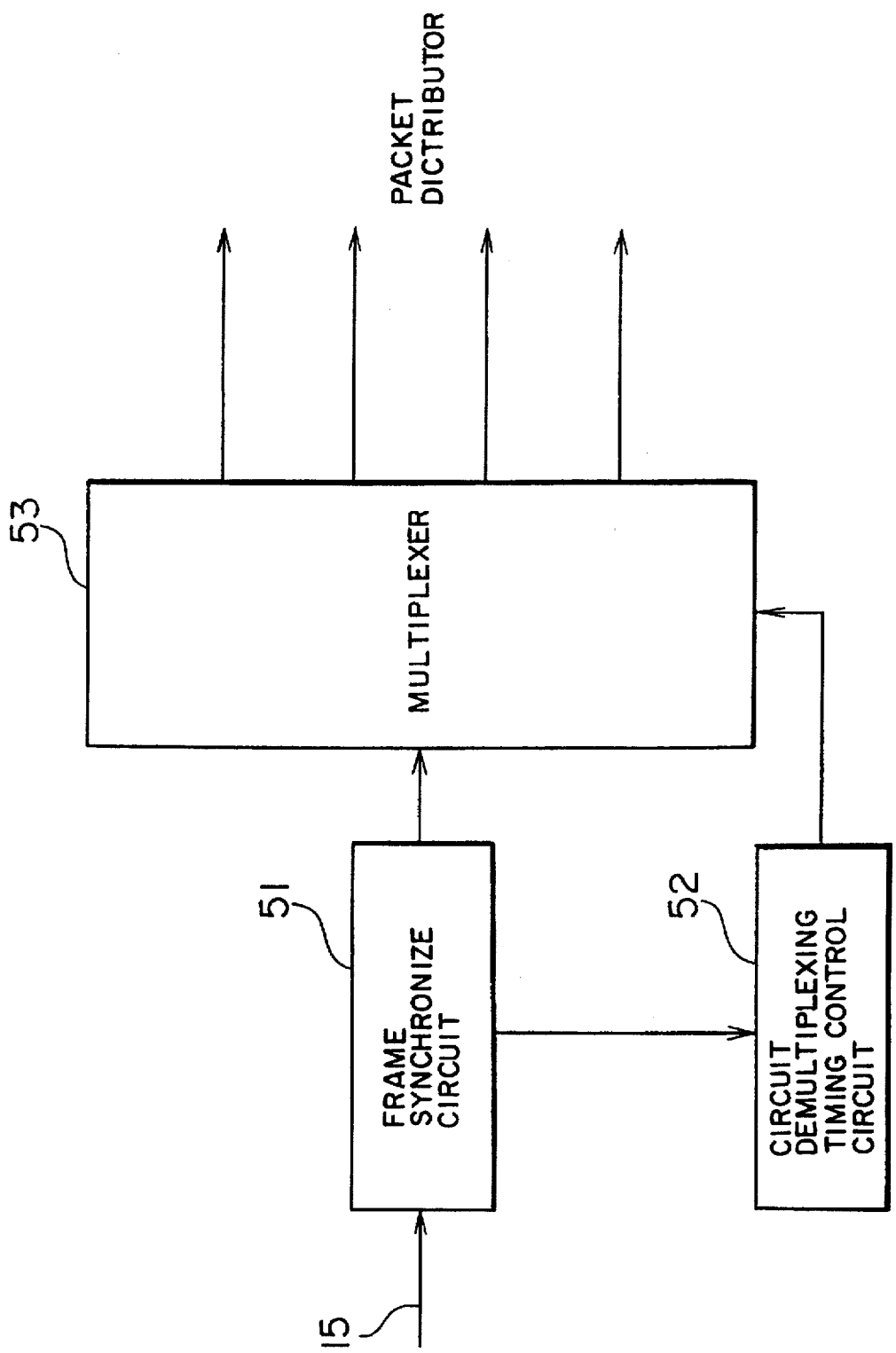

FIG. 5 shows a construction of the logical path demultiplexer 16. The circuit multiplexing signal which was input is supplied to a frame synchronize circuit 51, by which a frame synchronizing phase signal is detected. On the basis of the frame synchronizing phase signal, a signal to demultiplex individual primary circuits is formed by a circuit demultiplexing timing control circuit 52. A multiplexer 53 demultiplexes the individual primary circuits. The demultiplexed primary circuit signals are input to the packet distributor 17 through the multiplexing bus.

Figure 6:
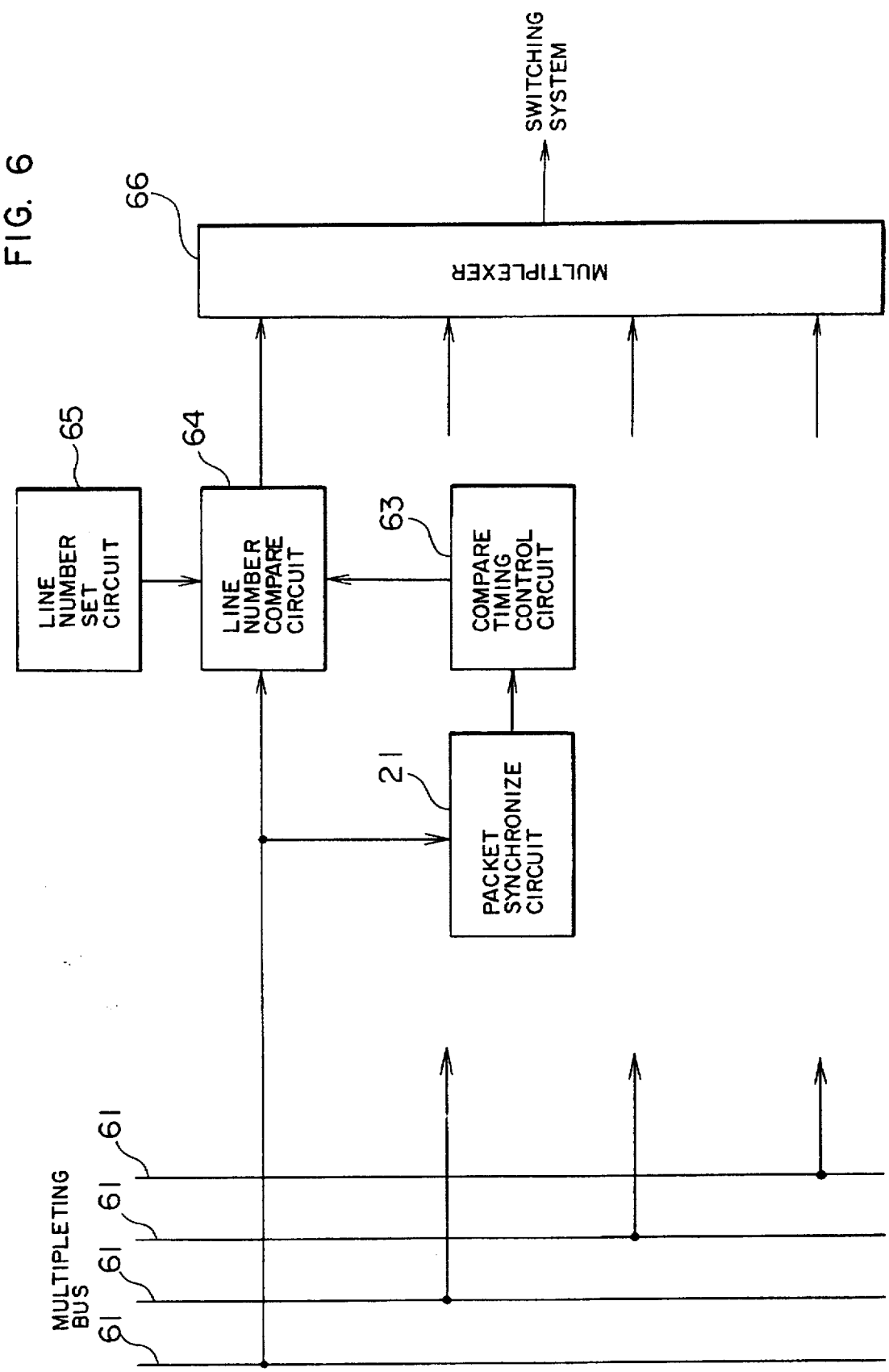

FIG. 6 shows a construction of the packet distributor 17. In the diagram, only one of the packet distributors 17 corresponding to four multiplexing buses is shown for simplicity. Timing information to demultiplex the packets by the packet synchronize circuit 21 is formed from the primary circuit signal which was input from the multiplexing bus 61. From the timing information, the timings to access to the subscriber line numbers in the packet headers are controlled by a compare timing control circuit 63. A subscriber line number compare circuit 64 compares the subscriber line numbers which were set by a subscriber line number set circuit 65 from the subscriber line numbers in the packet headers and sends the coincident subscriber line number to a multiplexer 66. The multiplexer 66 sequentially sends the signals which were input from the subscriber line number compare circuit 64 in correspondence to the circuits to the switching system 18.

The construction according to the embodiment has a feature such that for the switching system 18, the signals from the terminal equipment 11 are not so different from the signals in the case where the terminal equipment are directly enclosed in the switching system. There is an advantage such that the change of the switching system due to the execution of the statistical multiplexing is unnecessary.

Figure 7:
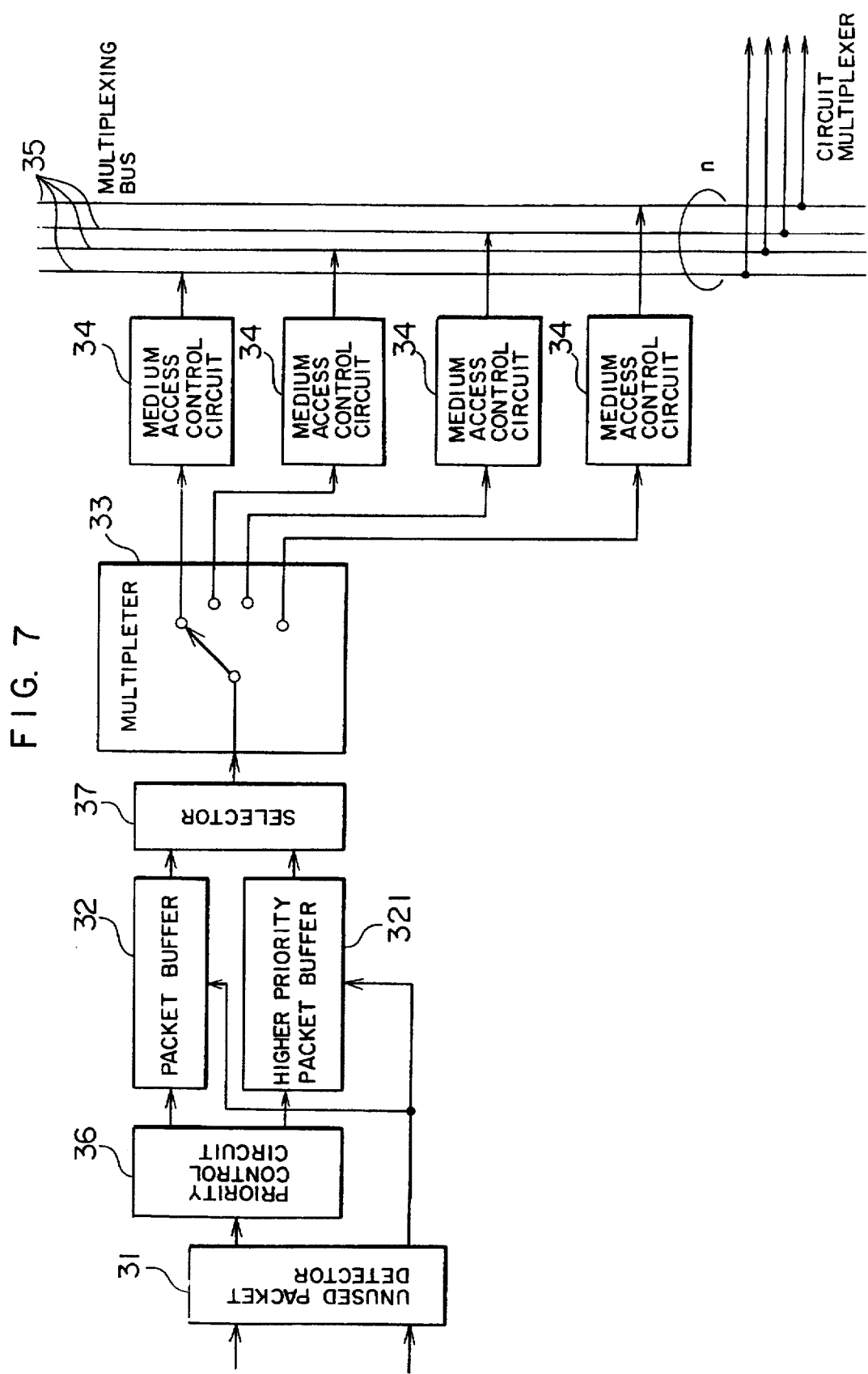
FIG. 7 is a diagram explaining another embodiment of the present invention.

FIG. 7 is a diagram showing another embodiment of the packet distributor 13. In the embodiment, the case where priorities are given to the packet transferring operations is shown. The packet having a higher priority is written into a higher priority packet buffer 321 by a priority control circuit 36 in accordance with the priority indication in the header. If a packet exists in the higher priority packet buffer, a priority packet selector 37 preferentially inputs this packet to the multiplexer 33. By using the priority information by the medium access control circuit 34, the priority control among different terminal equipment can be also executed. According to the embodiment, since the packet having a higher priority can be transferred earlier than the other packets, there is an advantage such that the real-time information such as audio information or the like can be assembled for packets and can be transferred.

Figure 8:
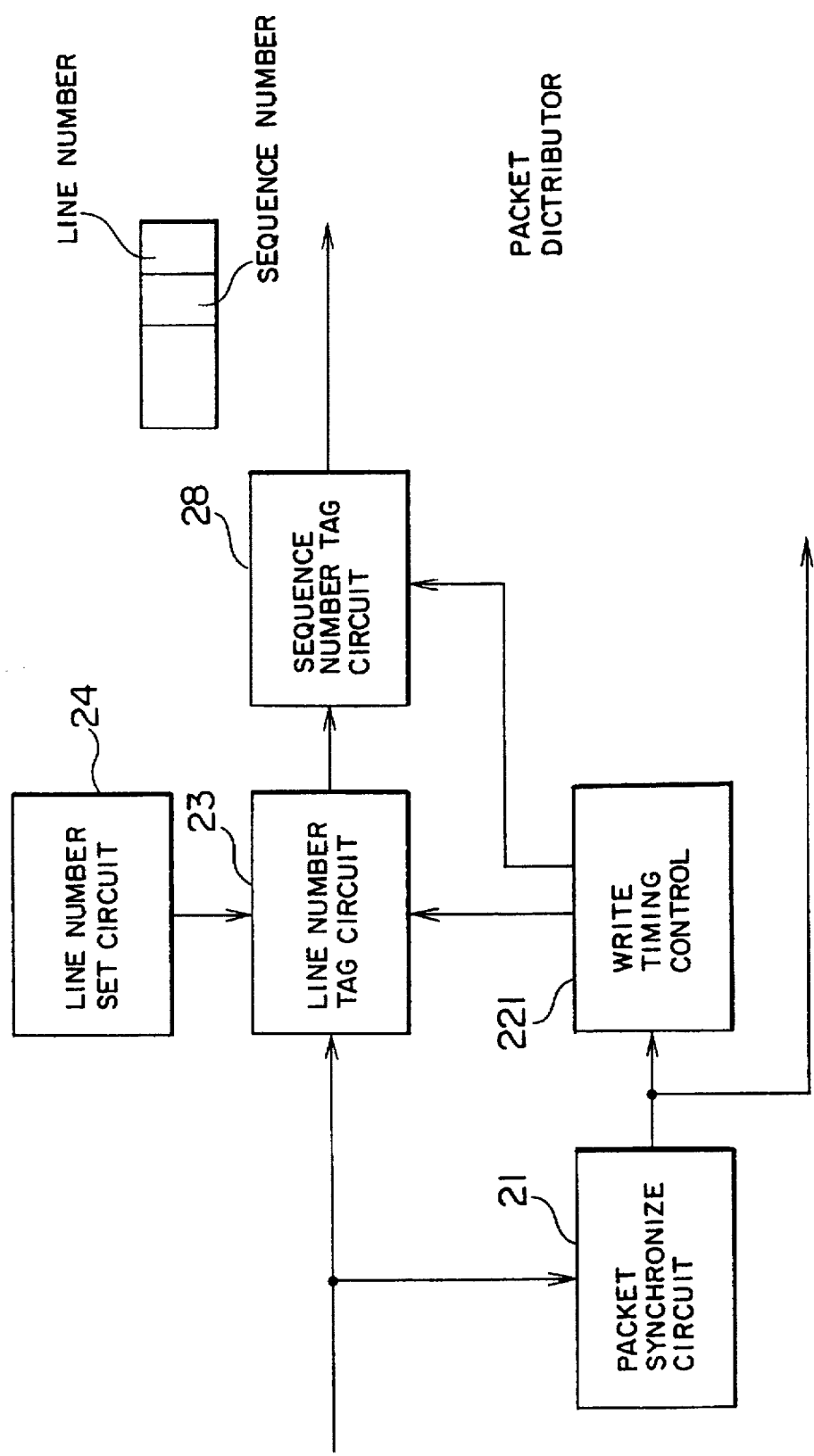
FIGS. 8 and 9 are diagrams showing further other embodiments of the invention.
Figure 9:
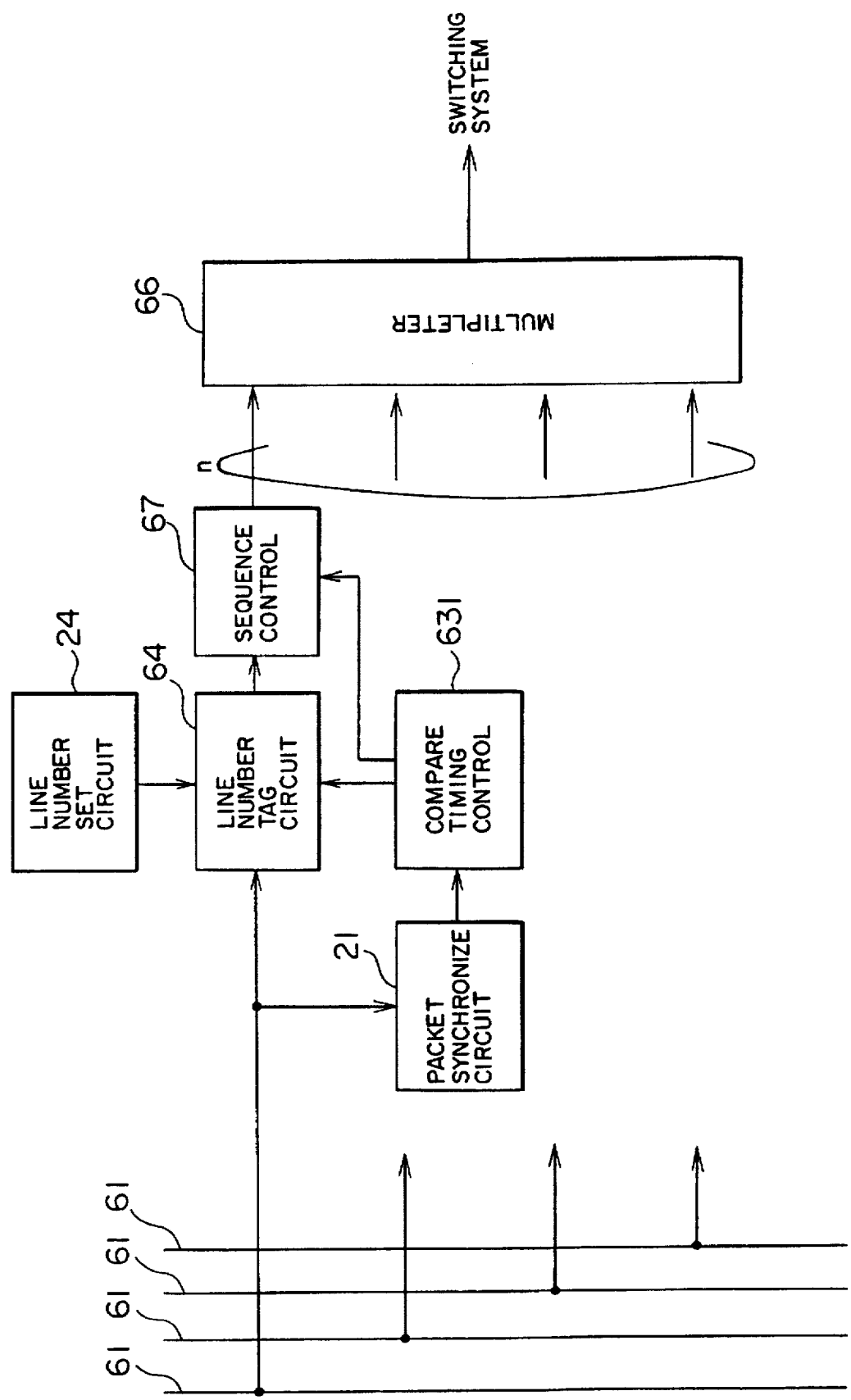

FIG. 8 is a diagram showing another embodiment of the invention. In the embodiment, the packet sequence numbers are written into the packet headers by the subscriber line number tag sections 12. A write timing control circuit 221 gives a write timing to a sequence number tag circuit 28. The sequence number tag circuit 28 writes the sequence numbers into the headers in accordance with a predetermined order. The packets to which the sequence numbers were written are supplied to a sequence control circuit 67 in the packet distributor 17 as illustrated in FIG. 9, and the sequence numbers are checked. If necessary the exchange of the packets occurs, and the packets are rearranged in the correct sequence. According to the embodiment, there are advantages such that not only the real-time information in which the transferring sequence of the packets is important can be correctly transferred but also in the case where the packets were abandoned during the statistical multiplexing process, the packets can be detected.

Figure 10:
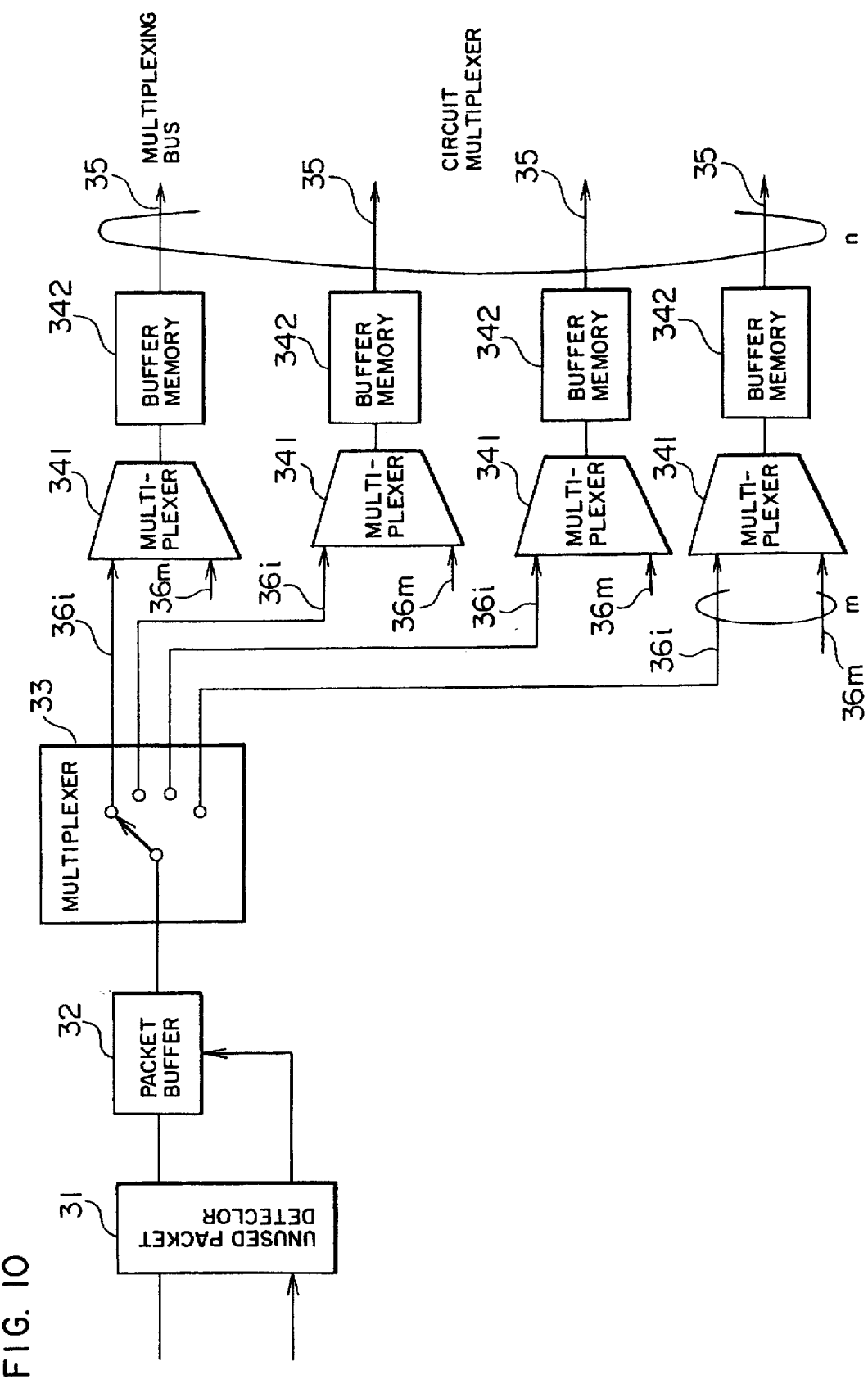

FIG. 10 illustrates another embodiment of the packet distributor 13 of the present invention. In the embodiment, outputs of the multiplexer 33 are multiplexed with outputs of (m-1) multiplexers (not shown) 33 corresponding to the other subscriber lines 19 by another multiplexer 341 and are written into one of n buffer memories 342. The written packets are sequentially read out and sent to the circuit multiplexer. The embodiment has a feature such that the buffer memories can be effectively used because the buffer memories are concentratedly provided.

Figure 11:
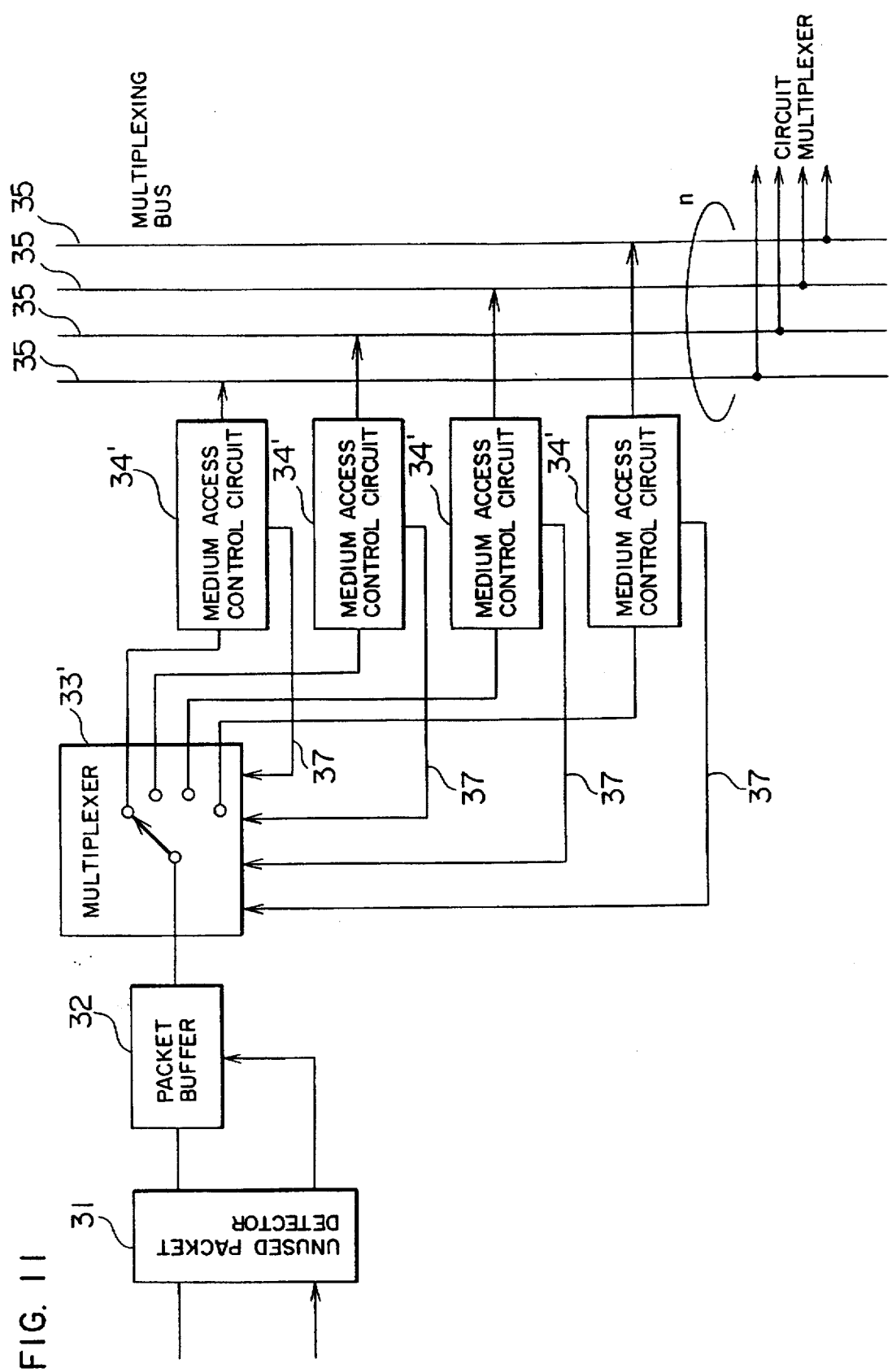

FIG. 11 is a diagram showing another embodiment of the packet distributor of the invention. In the embodiment, in order to guarantee the transmitting sequence of the packets, each medium access control circuit 34' which is provided with a feedback 37 from the medium access control circuit 34' to a multiplexer 33' accesses the multiplexing bus 35 and sends the packet and, thereafter, the completion of such processes is notified to the multiplexer 33' by the feedback 37. In response to such a notification, the multiplexer 33' switches the destination of the output. According to the embodiment, so long as the packet which has first arrived is not sent, the next packet is not sent, so that there is an advantage such that the packet sequence is correctly held.

As described above with respect to the embodiments, according to the method of the invention, the packet signals of a speed which is almost equal to the primary circuit speed are distributed to a plurality of primary circuits and are transmitted, so that there is an advantage such that the secondary circuit of a large capacity can be effectively used.

We claim:

1. A packet signal transmission system for transmitting a plurality of packets, comprising:

at least M first transmission lines having a first transmission rate (A), wherein M is an integer;

at least N first intermediate lines, each of said first intermediate lines having a transmission rate which is less than said first transmission rate (A), wherein N>M;

first means connected to said first transmission lines for distributing input packets successively received from each of said first transmission lines to said first intermediate lines in accordance with an order of arrival of said input packets so that each of said first intermediate lines carries a packet stream which includes input packets received from said first transmission lines; and second means for multiplexing a plurality of packet streams received from said first intermediate lines to one of a plurality of second transmission lines so that each of said packet streams received from said intermediate lines is carried through time slots periodically defined on the one of said second transmission lines;

said first and second means being constructed such that a transmission capacity (MXA) of said first transmission lines is equal to or smaller than a sum of transmission capacities of said second transmission lines.

2. A packet signal transmission system according to claim 1, further including a demultiplexing apparatus connected to said one of second transmission lines, said demultiplexing apparatus comprising:

third means connected to said second transmission lines for demultiplexing the contents of time slots on said one of said second transmission lines to a plurality of second intermediate lines prepared to correspond to said time slots on the second transmission lines; and fourth means connected to said second intermediate lines for distributing packet streams received from said second intermediate lines to a plurality of third lines, whereby a group of packets sent out from the same data source are selectively delivered to one of said third lines from said plural packet streams received from said second intermediate lines.

3. A packet signal transmission system according to claim 2, wherein said fourth means comprises:

means for distributing said packets streams to said third lines in accordance with routing information included in a header portion of each of said received packets.

4. A packet signal transmission system according to claim 1, wherein said first means comprises:

means for distributing said input packets to said first intermediate lines for each of said first transmission lines by cyclically switching one of said first intermediate lines, to which the input packet is distributed, every time an input packet is received from a first transmission line.

5. A packet signal transmission system according to claim 4, wherein said first means comprises:

means for distributing said input packets to said first intermediate lines by determining whether or not said one of said first intermediate lines to be distributed the input packet thereto is used to distribute another one of packets received from another one of said first transmission lines and for waiting until said one of said first intermediate lines becomes free if said one of said first intermediate lines was busy.

* * * * *